UNITED STATES PATENT OFFICE.

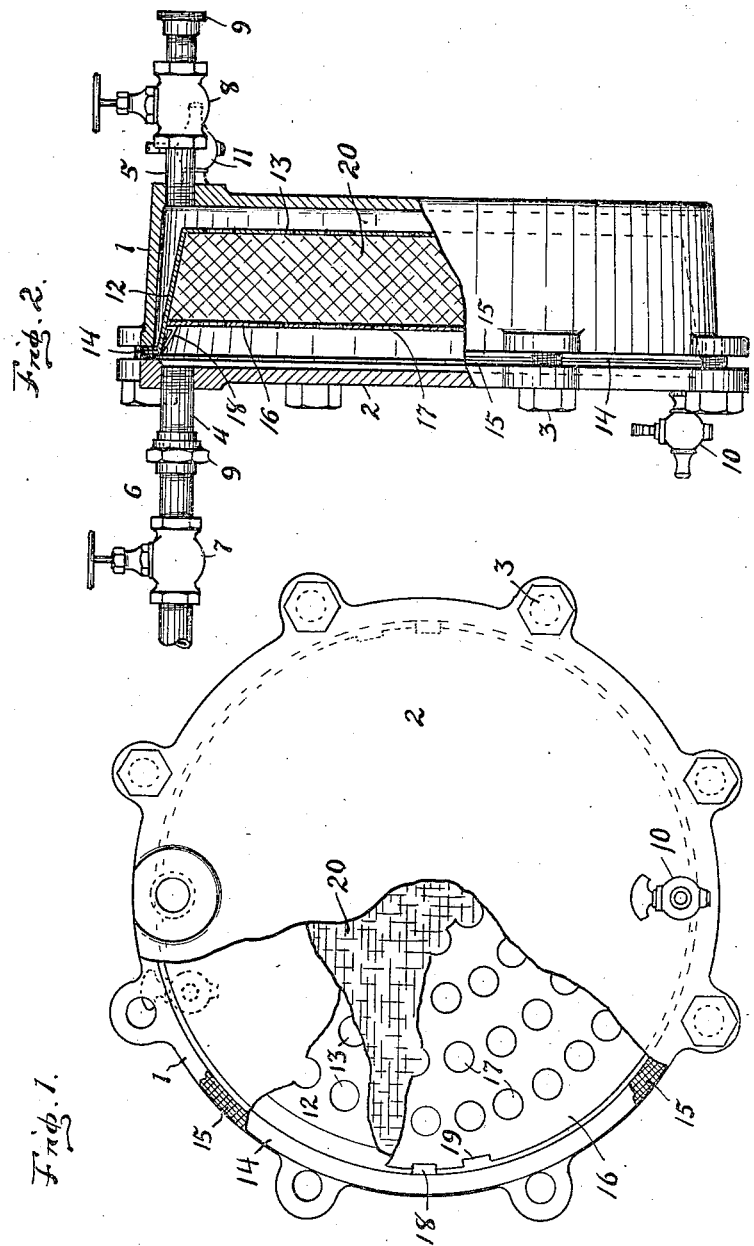

MILTON ELROD, OF INDIANAPOLIS, INDIANA, ASSIGNOR TO WARRINER MANUFACTURING COMPANY, A CORPORATION OF INDIANA.

FILTER.

1,422,190.   Specification of Letters Patent.   Patented July 11, 1922.

Application filed February 23, 1921. Serial No. 447,059.

*To all whom it may concern:*

Be it known that I, MILTON ELROD, a citizen of the United States of America, and resident of Indianapolis, in the county of Marion and State of Indiana, have invented certain new and useful Improvements in Filters, of which the following is a specification.

This invention relates to improvements in filters especially adapted for use in connection with domestic and other water distributing systems where the water enters through a supply pipe. The object of the invention is to provide a filtering apparatus that may be readily connected in line with the supply pipe of a water system, so that the entire supply of water entering the system will pass through the apparatus and be subjected to filtration therein. A further object is to so construct the apparatus that the filtering medium will be held compactly in a container that may be easily removed and replaced for the purpose of renewal.

The objects of the invention are accomplished by the construction illustrated in the accompanying drawings in which:

Fig. 1 is a front elevation of the invention with a portion thereof shown broken away to disclose interior parts thereof; and Fig. 2 is a side elevation projected from Fig. 1 and including the supply pipe and connections, a portion of the apparatus being shown broken away.

Similar characters of reference indicate corresponding parts in both views and having reference now to the same:

The invention is comprised of a case consisting of a shell 1 and removable head 2 held together by a series of bolts 3 extending around their perimeters. The case has an inlet pipe 4 communicating with the interior thereof through the head near the top thereof, and has also an outlet pipe 5 communicating with the interior of the case through the shell 1 and arranged approximately in line with the pipe 4. The pipes 4 and 5 are intended for connection in line with a water supply pipe 6, there being valves 7—8, one on each side of the case for controlling the flow of water in the supply pipe, and unions 9 for making connections with the supply pipe. A drain cock 10 has communication with the interior of the case at the bottom thereof through the head 2, and a test cock 11 has also communication with the interior of the case at the top thereof through the shell.

Within the case is removably mounted a cartridge comprised of a pan 12 having in its rear end numerous perforations 13, and at its front end an annular flange 14 that extends radially outward and which is adapted to be clamped between the shell 1 and its head, there being a gasket 15 on each side of the flange interposed also between the shell and head so that a tight joint is formed to prevent leakage of water from the case. The pan has a lid positioned in its front end consisting of a plate 16 having numerous perforations 17 therein. The plate is held in position in the pan by means or lugs 18 that project inwardly from the pan so as to engage the edge of the plate, there being notches 19 in the perimeter of the plate to accomodate the lugs as the plate enters the pan. By turning the plate so that its notches are moved aside from the lugs, outward movement of the plate is prevented by engagement of the lugs therewith.

The pan contains a quantity of filtering material 20 which is held compactly in place by the lid, so that the perforations in the end of the pan and in the lid are completely covered.

In the use of the invention the case is installed by connecting its inlet and outlet pipes with the water supply pipe of a water distributing system, so that the water entering the system through the supply pipe will first pass into the case and percolate through the filtering medium 20, by which the water is relieved of insoluble content and such foreign substances as find lodgment in the filtering element. Some of the solids contained in the water as it enters the case gravitate to the lower part thereof in front of the perforated lid and may be removed by opening the drain cock 10. This opertion relieves the case temporarily of accumulations of sediment.

When the filtering element becomes charged with accumulated foreign matter to the extent of its impairment, the case is disconnected and opened by removing the head. The cartridge is then bodily extracted from the shell and replaced by another cartridge packed with a fresh filtering element. The lid of the cartridge is removed by turning it so that its peripheral notches register with the lugs in the pan, thus permitting the lid to be removed outwardly. The filtering element, then being accessible, is removed and replaced by a fresh quantity of filtering material.

By the use of the invention thus applied, the water supply before passing into the distributing system is relieved of débris and such of its contained matter as settles within the case or finds lodgment in the filtering element as the water passes therethrough, and thus water is delivered from the case into the distributing system in a clear and purified condition.

The cartridge being in the form of a frustum, and the outermost perforations in the pan and lid suitably distant from the perimeters thereof prevents the water, in passing through the cartridges from by-passing the filtering medium, and the cartridge being secured by its flange between the shell and head of the case prevents the water, in passing through the case, from by-passing the cartridge.

What I claim is:

1. In a filter for a water distributing system, a case comprising a shell and head for closing same, having a drain cock communicating with its interior at the bottom thereof through the head, and a test cock having communication with its interior at the top thereof through the shell, and having an inlet pipe communicating with the interior of the case at the top thereof through the head and an outlet pipe communicating with its interior at the top thereof through the shell, said pipes being adapted to be connected in line with the supply pipe of the water distributing system; a cartridge having a radial flange at one end adapted to be clamped between the head and shell, and having a series of perforations in its opposite end and a removable perforated lid situated in its front end; and a filtering medium held compactly within the cartridge and covering all the perforations in the pan and lid.

2. In apparatus of the class described, a case comprised of a shell and lid therefor, and having an inlet through the head and outlet through the shell; a cartridge comprising a pan having perforations in its one end and a perforated lid removably positioned in its opposite end, said cartridge being so constructed as to be removably secured fixedly in the case so as to divide the case between its inlet and outlet into two separate compartments; and a filtering medium removably contained within the cartridge between its perforated end and lid.

3. In apparatus of the class described, a case consisting of a shell and removable head and having an inlet and outlet oppositely located; and a cartridge including a filtering medium and lid for securing the same therein, and being removably positioned within the case and so constructed that water in passing through the case will be directed through the filtering medium.

4. In filtering apparatus, a case comprised of a shell and head therefor; a cartridge comprised of a pan having perforations in one end and a flange secured between the shell and head, and having a perforated lid removably secured within its opposite end; and a filtering medium contained within the cartridge.

In testimony whereof I affix my signature in presence of two witnesses.

MILTON ELROD.

Witnesses:
 MATILDA METTLER,
 W. G. BURNS.